United States Patent Office 3,126,424
Patented Mar. 24, 1964

3,126,424
PRODUCTION OF BENZENE AND ITS TRISUBSTITUTED AND HEXASUBSTITUTED DERIVATIVES
Herbert Mueller, Ludwigshafen (Rhine)-Gartenstadt, and Herbert Friederich, Worms, Germany, assignors to Badische Anilin- & Soda-Fabrik Aktiengesellschaft, Ludwigshafen (Rhine), Germany
No Drawing. Filed Oct. 17, 1960, Ser. No. 62,883
Claims priority, application Germany Oct. 21, 1959
9 Claims. (Cl. 260—673)

This invention relates to a process for the catalytic production of benzene and its tri- and hexasubstituted derivatives with the use of a novel type of catalyst.

It is known that benzene is obtained in smalll yields by passing acetylene through hot tubes. It is further known that acetylene and mono- or disubstituted acetylenes can also be trimerized catalytically to afford benzene or the corresponding benzene derivatives. As catalysts for these known methods, organometallic compounds, complex compounds of the transition metals and metal carbonyls are generally employed. In some cases, two or more of these substances are used. Such methods are described, for example, in Belgian patent specification No. 567,744; British patent specification No. 802,510; U.S. patent specification No. 2,819,325; in "Abstracts of Papers," 7th–12th September (1958); in "Journal of the American Chemical Society," 80 (1958), p. 2913, and 81 (1959), p. 1514; and in "Justus Liebigs Annalen der Chemie," 629 (1960), p. 232. It is a disadvantage of the said known methods that they require the use of either the air-sensitive and pyrophoric organometallic compounds or the metal carbonyls which are poisonous and unpleasant to handle. A further disadvantage of the known methods is that in many cases they give unsatisfactory yields and space-time yields. Moreover the reaction products are often obtained in very impure form.

It is an object of the present invention to provide a process which does not require the use of air-sensitive and pyrophoric substances, or of substances that are poisonous and unpleasant to handle, as catalysts or catalyst components.

It is a further object of the invention to provide a process by which the products can be obtained in pure form and in good yields and good space-time yields.

We have found that the said objects can advantageously be achieved by catalytically trimerizing acetylene or mono- or disubstituted acetylene with the use of a catalyst system preparable from three components.

The first of the said three components is a titanium compound, an iron (III) halide or a nickel compound.

The second component is a metal of group IA, IIA, IIB, IIIA or of the lanthanide series of the periodic system.

The third essential component of the catalyst system is a halide of an element of group IIB, IIIA, IVA or VA of the periodic system.

The references to the groups of the periodic system are based on the long periodic table in which the transition elements are in the B groups or in group VIII, and the remaining elements form the A groups. It is essential that the catalyst system contain aluminum either in elementary form or as a halide.

Suitable initial materials are acetylene as well as acetylenes which are mono- or disubstituted by aliphatic, cycloaliphatic, araliphatic and/or aromatic radicals. Preferred substituted acetylenes are those in which the substituents are hydrocarbon radicals containing not more than 10 carbon atoms, but acetylenes substituted by higher radicals may also be reacted according to the new process. Suitable initial materials include: propine, butine-(1), pentine-(1), hexine-(1), octine-(1), dodecine-(1), octadecine-(9), octadecine-(1), vinyl acetylene, phenyl acetylene, cyclohexyl acetylene, benzyl acetylene, butine-(2), hexine-(3), methylethyl acetylene and tolane.

For the catalyst system to be used in the process according to this invention, a titanium compound, an iron (III) halide or a nickel compound is required as a first component. Titanium compounds suitable for the reaction are titanic(IV) acid esters, especially those derived from lower aliphatic alcohols with 1 to 4 carbon atoms, such as titanium tetramethylate, titanium tetraethylate and titanium tetrapropylate. Other useful titanium compounds include titanium trihalides and tetrahalides, especially the chlorides and bromides, such as titanium(III) chloride, titanium(III) bromide, titanium (IV) bromide and especially titanium(IV) chloride. Titanium ester halides may also be used for the process. By titanium ester halides we understand substances which, in addition to halogen, contain organic radicals attached to the titanium by way of oxygen. Those titanium ester halides are preferred which contain chlorine or bromine and have alkoxy radicals with 1 to 4 carbon atoms. Such compounds include diethoxy titanium(IV) dichloride and dibutoxy titanium(IV) dibromide. Organotitanium halides may also be used to prepare the catalyst system. Best results are achieved with organotitanium halides which contain hydrocarbon radicals with up to 8 carbon atoms and chlorine or bromine as the halogen, such as bis-cyclopentadienyl titanium(IV) dichloride and dimethyl titanium(IV) dibromide.

Preferred iron(III) halides which may be used instead of, or in addition to, a titanium compound, include iron (III) chloride and iron(III) bromide. The said salts are preferably used in anhydrous form.

The titanium compound and/or the iron(III) halide may also be replaced wholly or partly by a nickel compound. Nickel(II) compounds are preferred for this purpose. The salts of inorganic or organic acids and chelate complexes of divalent nickel may be used with special advantage. Although the nature of the anion in the nickel salts is not critical, those organic nickel salts are preferred which are derived from aliphatic or aromatic carboxylic acids with up to 18 carbon atoms. Suitable chelate complexes of divalent nickel may contain the usual organic complex-forming substances, such as $\beta$-dicarbonyl compounds, aromatic hydroxyaldehydes, aminophenols and 1,3-dioximes. The preferred nickel complexes are derived from complex-forming substances with 5 to 15 carbon atoms. Besides the usual chelate complexes of nickel, in which the nickel and the complex-forming substance are present in a mol ratio of 1:2, such complex nickel compounds may also be used with good results in which there is 1 molecule of one of the said complex-forming substances and 1 molecule of an alcohol, especially of an aliphatic monohydric or dihydric alcohol with up to 8 carbon atoms, to the nickel atom. Particularly suitable nickel(II) compounds include nickel chloride, nickel bromide, nickel iodide, nickel carbonate, nickel formate, nickel acetate, nickel oxalate, nickel benzoate, nickel oleate, nickel sulfate, nickel nitrate, nickel acetylacetonate, nickel acetoacetic acid ester, nickel benzoyl acetonate, nickel monoacetyl acetonate ethylate and nickel dimethylglyoxime. Further suitable nickel compounds include nickel(II) oxide, nickel(II) hydroxide, nickel(III) hydroxide and nickel sulfide. The nickel compounds are preferably used in anhydrous form. Water-containing nickel compounds, for example compounds containing water of crystallization, may be used provided the water is removed in a suitable manner, for example by adding an appropriate excess of the said metal of group IA, IIA, IIB, IIIA or the lanthanide series of the periodic system.

As a second component for the preparation of the catalyst system, a metal of group IA, IIA, IIB, IIIA or the lanthanide series of the periodic system is required. It is preferable to use lithium, sodium, potassium, beryllium, magnesium, calcium, strontium, barium, aluminum, gallium, indium, zinc or cerium. Best results are obtained with aluminum and zinc. The metals are preferably used in a form in which they have a large surface area, for example as chips, shavings or powder. Both technical-grade and highly purified metals may be used. Obviously, it is also possible to use alloys or mixtures of two or more of the said metals.

The third essential component of the catalyst system is a halide of an element of group IIB, IIIA, IVA or VA of the periodic system. Best results are obtained with the chlorides or bromides of boron, aluminum, gallium, indium, thallium, silicon, tin, zinc, phosphorus, antimony and bismuth. Obviously, two or more of the said compounds may be added.

If the first component of the catalyst system contains a halogen (for example titanium(IV) chloride or iron(III) bromide) and aluminum is used as the metal, the addition of one of the said halides is not required, because in this case aluminum halide is formed in situ.

An improvement in the effectiveness of the catalyst system can often be achieved by adding a substance which is capable of forming complexes with halides, such as aluminum chloride, zinc chloride, tin tetrachloride or antimony chloride. Substances suitable for this purpose are those which are capable of occupying any gaps that may be present in the electron shells of the central atoms of the halides. If a halogen compound is used whose central atoms contain a complete electron shell, the complex forming substances must be capable of coordinatively saturating the central atoms. Especially suitable complex-forming substances include ethers, thioethers, sulfoxides, nitrones, tertiary bases, alkali halides, alkali hydroxides, alkali hydrides, alkali cyanides, alkaline earth halides, alkaline earth hydroxides, alkaline earth hydrides and alkaline earth cyanides. In the case of organic complex-forming substances, the particular structure is not critical. The only essential requirement is the presence of the characteristic group (ether oxygen, tertiary nitrogen atom, etc.). For practical reasons, however, those organic complex-forming substances are preferred which, apart from the characteristic functional group, only show hydrocarbon structures. Suitable complex-forming substances include: anisol, phenetol, diethyl ether, diphenyl ether, diphenylene oxide, diphenyl sulfide, thiodibutyric acid, quinoline, triethylamine, sodium chloride, magnesium chloride, calcium chloride, lithium hydride, calcium hydride and potassium cyanide.

The amounts of the substances used to prepare the catalyst may vary within wide limits and are readily ascertained by a preliminary experiment. Good yields are obtained, for example, by using relative proportions of titanium compound or iron halide or nickel compound to metal to halide of 1:300:100 and 1:10:10. In the foregoing proportions, the amount of titanium compound, iron halide or nickel compound as well as the amount of halide is expressed in mols, whereas for the metals the redox equivalents have been specified. The said ratios are, however, not critical. It is also possible to allow the proportion of the titanium compound to exceed that of the other components. The said complex-forming substance is advantageously used in such an amount that the mol ratio of the sum of the titanium compound or iron halide or nickel compound and halide to the complex-forming substance lies between 1:0.2 and 1:3.

The catalyst need be used only in small amounts, with reference to the acetylene or substituted acetylene. The reaction velocity is still satisfactory even if the amount of catalyst is, for example, 0.3% by weight with reference to the initial material.

The new process is advantageously carried out in the presence of an inert solvent. Such solvents include hydrocarbons, halogen hydrocarbons, and ethers, such as benzene, toluene, xylene pentane, ethylbenzene, cumene, chlorbenzene, heptane, cyclohexane, isooctane and tetrahydrofurane. It is recommendable to use anhydrous and thoroughly purified solvents. Aromatic hydrocarbons are preferred. Solvent mixtures may also be used with good results, for example mixtures which contain chiefly chlorbenzene, heptane or cyclohexane and small amounts of benzene or toluene. In general, 0.2 to 0.5 time the amount of solvent is used wtih reference to the 1,3-diene.

The process may be carried out within a wide temperature range, namely between —50° and 150° C. The preferred reaction temperature lies between 20° and 100° C. As a rule, atmospheric pressure is used, but it is also possible to work under reduced or increased pressure. Especially when low-boiling initial materials and elevated reaction temperatures are employed, increased pressures, for example up to 10 atmospheres gage, are sometimes required.

The catalyst system is formed by the interaction of the three components. It is therefore sufficient to bring the three components into contact with one another, the sequence being optional. It is also possible to first allow only two of the components, for example the titanium, iron or nickel compound and the metal, to interact and then to add the metal halide and possibly a complex-forming substance.

For carrying out the process according to the present invention, it is advantageous to "develop" the catalyst by intimately mixing for some time the titanium compound (or the iron halide or the nickel compound), the metal and the halide, preferably in the solvent to be used for the reaction. This operation is most preferably carried out in a ball mill. Any other method by which the surface of the metal is kept permanently clean by suitable measures may also be used with advantage. It is preferable to carry out the intimate mixing in an atmosphere of inert gas, such as nitrogen or argon. Although it is usual to work at room temperature, it is also possible to use elevated temperatures of up to 150° C., especially when a low-melting metal, e.g. an alkali metal, is used. The interaction of the catalyst components is considerably more intensive when the metal is present in the fused state. The optimum duration of the mixing operation depends, inter alia, on the components used and is readily ascertained by experiment. In general, it is about 1 to 10 hours.

The development of the catalyst may also be carried out advantageously by intimately mixing only one or two of the catalyst components with the solvent to be used and then uniting the dispersion thus obtained with the other catalyst component or components, if desired in a solvent. Finally, it is also possible to place the catalyst components in a solvent and to immediately supply the acetylene with intimate mixing, for example by means of a high efficiency stirrer. It is preferable, however, to develop the catalyst prior to the supply of the acetylene. If a salt, for example sodium chloride, is used as complex-forming substance, it should be used in powdered form. Pulverization is advantageously carried out in a ball mill, possibly with the addition of a grinding auxiliary, such as aluminum oxide.

The acetylene is introduced into the catalyst mixture thus obtained, which in most cases has the form of a suspension. In many cases, the reaction sets in immediately with considerable evolution of heat. In all cases, the desired reaction temperature is readily maintained by heating or cooling. To complete the reaction, the temperature level is preferably maintained for some time after all the initial material has been supplied. The catalyst is then destroyed, for example by careful addition of a small amount of water or an alcohol, such as methanol or ethanol, or by the action of a comparatively large amount of acetone on the reaction mixture, small amounts of polymers also being separated during this operation. If the decomposition is carried out with water or an alcohol, it is recommendable to previously add to the mixture a small amount of another substance which contains solitary electron pairs or has complex-forming properties. Ketones, ethers, ammonia, amines, acid amides, esters, sulfides and alkali halides, etc., are suitable for this purpose. After decomposition of the catalyst, the mixture is worked up in the usual manner, for example by extracting with water and distillation of the organic phase after separation of the same from the aqueous phase, or, if decomposition has been carried out with an alcohol, by distillation after the solid constituents have been separated.

The process can be carried out continuously without dfficulty, for example in a reaction vessel to which the catalyst solution and the acetylene are supplied simultaneously and continuously. The effluent reaction mixture is continuously decomposed with methanol and supplied to a continuously operating distillation apparatus.

Some of the compounds prepared according to this invention are important solvents, for example benzene and trialkylbenzenes, such as mesitylene. The trialkylbenzenes may also be converted into the corresponding tricarboxylic acids. This may be effected, for example, by oxidation with nitric acid or with oxygen in the presence of an oxidation catalyst. Both of the said processes are well known in the art. The benzene tricarboxylic acids are known as valuable substances for the production of branched-chain polyesters. In an analogous manner, the hexasubstituted benzenes may be converted into metallic acid, from which pyromellitic acid is in turn obtainable by heating. This acid likewise is a valuable constituent of branched-chain polyesters. Hexaphenylbenzene, on account of its high decomposition point, is eminently suited for use as a bath for temperatures above 400° C. By heating with sodium chloride and aluminum chloride to temperatures of 120° to 130° C., hexaphenylbenzene may also be converted into compounds with condensed ring systems, e.g., hexabenzocoronene. These substances are valuable intermediate products for the preparation of dyes.

The following examples will further illustrate this invention, but the invention is not restricted to these examples. The parts specified in the examples are parts by weight.

*Example 1*

15 parts of aluminum and 15 parts of aluminum chloride in 180 parts of benzene are ground for 24 hours in a vibratory mill. 18 parts of the resultant suspension are added to 90 parts of toluene containing 1.14 parts of titanium tetrachloride. 18 parts of n-octine-(1) are added carefully, the temperature being kept at 50° C. by cooling. The whole is stirred for another three hours at room temperature, and the catalyst is then decomposed by adding 10 parts of methanol. The reaction solution is washed with 10% sulfuric acid and water, and the organic phase is dried over calcium chloride and distilled. 10 parts of a fraction which boils at 120° to 130° C. ($10^{-4}$ mm. Hg) and consists of an about equimolecular mixture of 1,3,5- and 1,2,4-tri-n-hexylbenzene are obtained. The refractive index is $n$ 20/D 1.4830. 4 parts of a dark brown viscous oil remain as a distillation residue.

*Example 2*

A catalyst suspension is prepared from 19 parts of the aluminum/aluminum chloride suspension described in Example 1 and 1.14 parts of titanium tetrachloride in 70 parts of benzene. A solution of 30 parts of tolane in 50 parts of benzene is added to the said mixture, the reaction temperature being kept at 60° C. by cooling. To complete the reaction, the whole is stirred for another two hours at room temperature. The reaction solution is then poured into 400 parts of methanolic hydrochloric acid. 8 parts of hexaphenylbenzene (melting point 423° to 427° C.) are precipitated.

*Example 3*

A catalyst is prepared from 19 parts of the aluminum/aluminum chloride suspension described in Example 1, 1.14 parts of titanium tetrachloride and 90 parts of benzene. 110 parts of phenylacetylene are added slowly to this mixture while cooling. The reaction temperature is kept at 50° C. The mixture is stirred for another 24 hours at room temperature and then poured into 500 parts of acetone. 20 parts of crystallized 1,3,5-triphenylbenzene (melting point 172° C.) are separated. The acetone solution is washed with water, the organic phase is dried over calcium chloride, and the benzene is then distilled off. By recrystallization from alcohol, 50 parts of a mixture of 1,3,5- and 1,2,4-triphenylbenzene (melting point 106° C.) are recovered from the distillation residue.

*Example 4*

20 parts of hexine-(3) are reacted at 60° C., while using the catalyst described in Example 3. The reaction mixture is stirred for another five hours at 60° C., then washed with dilute sulfuric acid and water, and dried over calcium chloride. After distilling off the benzene, 16 parts of hexaethylbenzene (melting point 128° C.) remain as a distillation residue.

*Example 5*

1.14 parts of titanium tetrachloride and 2 parts of aluminum grit are ground for three hours in a ball mill in 90 parts of benzene. The suspension formed is transferred to a stirring vessel, and 45 parts of hexine-(3) are added in the course of one hour. The temperature is kept at 50° C. by cooling. The reaction is allowed to continue for another two hours, the catalyst is decomposed with methanol and the reaction solution washed with dilute sulfuric acid and then with water. The dried solution is freed from benzene in vacuo. 40 parts of hexaethylbenzene (melting point 128° C.) remain as a residue.

By using 1 part of titanium trichloride instead of titanium tetrachloride and otherwise working under identical conditions, 37 parts of hexaethylbenzene are obtained.

*Example 6*

2 parts of aluminum, 2 parts of aluminum chloride and 1.14 parts of titanium tetrachloride are ground in 90 parts of toluene for three hours. 0.5 part of sodium chloride is added to the catalyst solution thus prepared. The solution is then saturated with acetylene for 50 minutes at 50° C. 18 parts of acetylene are reacted. The whole is stirred for another two hours at 50° C. The catalyst is then decomposed with 10 parts of ether and 10 parts of methanol. 8 parts of benzene are recovered from the resultant reaction product by distillation.

*Example 7*

17 parts of titanium tetrachloride, 4.9 parts of aluminum grit and 15 parts of aluminum chloride are heated for 20 hours in 130 parts of benzene at 80° C. 14 parts of the resultant solution are diluted with 90 parts of benzene, and 25 parts of hexine-(3) are added slowly while stirring. The temperature is kept at 50° C. by cooling. After the hexine-(3) has been added, the whole is stirred overnight. The reaction product is then washed with dilute sulfuric acid and water and the organic phase concentrated by evaporation in vacuo. 20 parts of hexaethylbenzene (melting point 126° C.) remain as a residue.

*Example 8*

A catalyst suspension is prepared by grinding 1.14 parts of titanium tetrachloride, 5 parts of aluminum chloride, 0.2 part of magnesium and 90 parts of benzene for three hours in a ball mill. 1 part of powdered sodium chloride is added. Then 20 parts of hexine-(3) are added slowly while stirring, the temperature being kept at 50° C. by cooling. After the addition of hexine-(3) has been completed, the mixture is stirred for another two hours at 50° C. and then poured into 200 parts of acetone. The acetone solution is washed with dilute sulfuric acid and then with water, and is subsequently dried over calcium chloride. By distillation under reduced pressure, the benzene is removed. 18 parts of hexaethylbenzene (melting point 125° C.) remain as a distillation residue. By a single recrystallization from alcohol, an analytical-grade product of the melting point 129° C. is obtained.

By using 1 part of dichlorotitanium propylate instead of titanium tetrachloride, 15 parts of hexaethylbenzene are obtained.

Example 9

The procedure described in Example 8 is followed, but the catalyst is prepared from 0.7 part of titanium tetrachloride, 1 part of gallium, 1 part of aluminum chloride and 90 parts of benzene. 19 parts of hexaethylbenzene (melting point 129° C.) are obtained from 20 parts of hexine-(3).

Example 10

The procedure described in Example 8 is followed, but 1.14 parts of titanium tetrachloride, 2 parts of aluminum and 2 parts of antimony trichloride are used to prepare the catalyst suspension. 20 parts of hexaethylbenzene (melting point of the crude product: 121° C.) are obtained from 20 parts of hexine-(3).

By using titanium tetrabromide, titanium tetraethylate or monochlortitanium triethylate instead of titanium tetrachloride, the yields of hexaethylbenzene are 90%, 85% and 82%, respectively, of the reacted hexine-(3).

Example 11

In the manner described in Example 8, a catalyst suspension is prepared from 1.14 parts of titanium tetrachloride, 2 parts of aluminum grit and 3 parts of bismuth trichloride in 90 parts of benzene. 40 parts of hexine-(3) are added, the temperature being kept at 50° C. by cooling. After the addition of the initial material has been completed, the whole is stirred for another hour. The benzene reaction solution is washed with dilute sulfuric acid and then with water. After evaporating the solvent and the low-boiling constituents from the organic phase, 37 parts of hexaethylbenzene (melting point 125° to 127° C.) are obtained.

Example 12

In the manner described in Example 8, a catalyst suspension is prepared from 0.4 part of sodium, 1.14 parts of titanium tetrachloride, 5 parts of aluminum chloride and 90 parts of benzene. 1.2 parts of powdered sodium chloride and 20 parts of hexine-(3) are added, and the mixture is stirred for 48 hours at room temperature. The further procedure is the same as described in Example 11. 3 parts of hexaethylbenzene (melting point 126° C.) are obtained.

Example 13

In the manner described in Example 8, a catalyst suspension is prepared from 1.14 parts of titanium tetrachloride, 1 part of beryllium, 2 parts of aluminum chloride and 90 parts of xylene. 10 parts of hexine-(3) are added to the suspension, and the mixture is stirred for 40 hours at room temperature. By working up the reaction product, 3 parts of hexaethylbenzene are obtained.

Example 14

In the manner described in Example 8, a catalyst suspension is prepared from 1.14 parts of titanium tetrachloride, 2 parts of cadmium, 2 parts of aluminum chloride and 90 parts of a mixture of equal parts by volume of benzene and heptane. 20 parts of hexine-(3) are added to the catalyst suspension. The mixture is stirred for two hours at room temperature and then worked up as described in Example 11. 20 parts of crude hexaethylbenzene (melting point 120° C.) are obtained.

Example 15

The procedure described in Example 8 is followed, but the catalyst is prepared from 1.14 parts of titanium tetrachloride, 4 parts of zinc powder, 2 parts of aluminum chloride and 90 parts of benzene. 40 parts of hexine-(3) are added to the catalyst suspension at 50° C. 39 parts of hexaethylbenzene (melting point 128°) are obtained by working up in the usual manner.

Example 16

A catalyst suspension is prepared by grinding 5 parts of nickel acetylacetonate, 6 parts of aluminum, 6 parts of aluminum chloride and 1.5 parts of sodium chloride in 250 parts of benzene for three hours. 40 parts of hexine-(3) are added to the suspension, and the mixture is stirred for 20 hours at room temperature. The further procedure is the same as described in Example 11. 20 parts of hexaethylbenzene are obtained as a distillation residue.

By using 5 parts of nickel chloride or nickel dimethylglyoxime instead of nickel acetylacetonate and otherwise working under identical conditions, 15 and 17 parts of hexaethylbenzene, respectively, are obtained. Similar results are obtained by using nickel acetate, nickel oleate or nickel benzoate.

Example 17

In the manner described in Example 16, a catalyst is prepared from 1.14 parts of titanium tetrachloride, 2 parts of aluminum, 2 parts of zinc chloride and 100 parts of chlorbenzene. 45 parts of phenylacetylene are gradually added at 50° C. to this suspension, the heat of reaction being removed by cooling. After all the phenylacetylene has been added, the whole is stirred for another hour at the said temperature and the reaction mixture added to 300 parts of acetone. The deposited solid constituents are filtered off, and the acetone solution is washed several times with water. The benzene is separated by distillation under reduced pressure. 40 parts of a partly crystalline mass are obtained which, after recrystallization from alcohol, gives 30 parts of yellow-colored crystals consisting of about 60% of 1,3,5- and about 40% of 1,2,4-triphenylbenzene. The mixture melts between 120° and 150° C.

Example 18

In the manner described in Example 16, a catalyst is prepared from 2 parts of titanium tetrabromide, 0.05 part of lithium, 0.1 part of magnesium, 4 parts of aluminum chloride, 1 part of sodium chloride and 90 parts of benzene. 45 parts of phenylacetylene are added to the catalyst solution of 50° C. The further procedure is the same as described in Example 17. After recrystallization of the distillation residue from ethanol, 30 parts of a mixture of 1,3,5- and 1,2,4-triphenylbenzene (melting between 115° and 160° C.) are obtained.

Example 19

The procedure described in Example 16 is followed, but the catalyst is prepared from 90 parts of benzene, 1.14 parts of titanium tetrachloride, 1 part of aluminum and 0.7 part of boron trichloride. 2 parts of diphenyl sulfide are added. 48 parts of hexaethylbenzene are obtained from 50 parts of hexine-(3) with this catalyst suspension.

Example 20

A catalyst suspension is prepared by grinding 1.14 parts of titanium tetrachloride, 0.5 part of calcium, 4 parts of aluminum chloride and 3 parts of diphenyl ether in 90 parts of benzene for three hours in a ball mill. 45 parts of phenylacetylene are reacted with the catalyst suspension in the manner described in Example 17. 37 parts of 1,2,4- and 1,3,5-triphenylbenzene (melting between 118° and 148° C.) are obtained.

Example 21

The procedure described in Example 20 is followed, but the catalyst is prepared from 1.14 parts of titanium tetrachloride, 2 parts of aluminum, 1.1 parts of tin tetrachloride, 0.5 part of sodium chloride and 90 parts of benzene. By reacting 50 parts of phenylacetylene at 60° C., 40 parts of 1,3,5- and 1,2,4-triphenylbenzene are obtained.

Example 22

In the manner described in Example 16, a catalyst is prepared from 90 parts of benzene, 1.14 parts of titanium tetrachloride, 8 parts of cerium, 2 parts of aluminum chloride and 0.5 part of sodium chloride. 40 parts of propine are gradually added to the suspension at 60° to 70° C. After all the propine has been added, the reaction mixture is added to 330 parts of acetone. The deposited solid constituents are separated, and the acetone solution is washed with water. By distillation of the organic phase, 25 parts of an about equimolecular mixture of 1,3,5- and 1,2,4-trimethylbenzene (boiling point 56° C. at 12 mm. Hg; refractive index $n$ 20/D 1.4998) are obtained.

By using octine-(1) instead of propine, 20 parts of 1,3,5- and 1,2,4-trihexylbenzene (boiling point 130° C. at $10^{-4}$ mm. Hg; refractive index $n$ 20/D 1.4830) are obtained.

Example 23

In the manner described in Example 8, a catalyst suspension is prepared from 4.8 parts of iron(III) chloride, 6 parts of aluminum, 6 parts of aluminum chloride, 1.5 parts of sodium chloride and 270 parts of benzene. 28 parts of hexine-(3) are added, and the mixture is stirred for 48 hours at room temperature. The reaction mixture is washed with dilute sulfuric acid and then with water. The solvent and the low-boiling constituents are removed by distillation under reduced pressure. 22 parts of a partly crystalline mixture remain as a residue from which, by recrystallization from ethanol, 10 parts of pure hexaethylbenzene (melting point 129° C.) are obtained.

Example 24

A catalyst suspension is prepared by grinding 100 parts of xylene, 1.14 parts of titanium tetrachloride, 2 parts of aluminum chloride and 6 parts of zinc for three hours in a vibratory mill. The suspension is then saturated with acetylene for one hour at 50° C. After the addition of acetylene has been completed, stirring is continued for one hour and the catalyst then decomposed by means of a small amount of ether and methanol. All distillable constituents are distilled out of the reaction mixture in vacuo. A toal of 12 parts of benzene is obtained.

We claim:

1. In a process for the production of benzene and trisubstituted and hexasubstituted benzene derivatives by catalytic trimerization of acetylene, monosubstituted and disubstituted acetylenes, the improvement which comprises trimerizing the acetylene reactant with a catalyst system obtained by the interaction of the components:
   - (a) a compound selected from the group consisting of titanic (IV) acid esters, titanium trihalides, titanium tetrahalides, titanium ester halides, iron (III) chloride, iron (III) bromide, nickel (II) salts of inorganic and organic acids and chelate complexes of divalent nickel;
   - (b) a metal selected from the group consisting of lithium, sodium, potassium, beryllium, magnesium, calcium, strontium, barium, aluminum, gallium, indium, zinc and cerium; and
   - (c) a halide of an element selected from the group consisting of boron, aluminum, gallium, indium, thallium, silicon, tin, zinc, phosphorous, antimony and bismuth;

with the proviso that at least one of the components (b) and (c) contains aluminum.

2. A process as claimed in claim 1 wherein a complex-forming substance selected from the class consisting of ethers, thioethers, sulfoxides, nitrones, tertiary bases, alkali halides, alkaline earth halides, alkali cyanides and alkaline earth cyanides is co-employed with said catalyst system.

3. A process as claimed in claim 1 wherein a halogen-containing compound from group (a) and aluminum are used so that an aluminum halide is formed therefrom in situ.

4. A process as claimed in claim 1 wherein the reaction is carried out in an inert solvent.

5. A process as claimed in claim 1 wherein the reaction is carried out in an inert gas atmosphere.

6. A process as claimed in claim 1 wherein the reaction is carried out at a temperature of between 20° C. and 100° C.

7. A process as claimed in claim 1 wherein component (a) is a titanium halide, component (b) is aluminum and component (c) is an aluminum halide.

8. A process as claimed in claim 1 wherein component (a) is a titanium halide, component (b) is aluminum, and component (c) is a zinc halide.

9. A process as claimed in claim 1 wherein component (a) is a titanium halide, component (b) is sodium and component (c) is an aluminum halide.

References Cited in the file of this patent

UNITED STATES PATENTS 2,918,507    Kennedy et al.    Dec. 22, 1959

FOREIGN PATENTS 802,510    Great Britain    Oct. 8, 1958